United States Patent [19]

Kosaka et al.

[11] Patent Number: 4,512,002
[45] Date of Patent: Apr. 16, 1985

[54] TRACKING SERVO SYSTEM OF RECORDING DISC INFORMATION RECORDING AND REPRODUCING APPARATUS

[75] Inventors: Minoru Kosaka; Toru Akiyama, both of Tokorozawa, Japan

[73] Assignee: Universal Pioneer Corporation, Tokyo, Japan

[21] Appl. No.: 481,261

[22] Filed: Apr. 4, 1983

Related U.S. Application Data

[63] Continuation of Ser. No. 204,753, Nov. 6, 1980.

[30] Foreign Application Priority Data

Nov. 8, 1979 [JP] Japan ................... 54-155227[U]

[51] Int. Cl.³ ............................................. G11B 21/10
[52] U.S. Cl. ..................................... 369/44; 369/124; 250/202

[58] Field of Search .............. 369/47, 48, 50, 32, 369/44, 43, 111, 124; 360/72.2, 27, 77, 38.1; 358/342; 250/202; 318/577

[56] References Cited

U.S. PATENT DOCUMENTS

4,138,663 2/1979 Lehureau .............................. 369/44
4,160,270 7/1979 Goldschmidt ................... 358/128.6
4,268,745 5/1981 Okano ................................. 369/44
4,338,682 7/1982 Hosaka ................................ 369/44

Primary Examiner—Alan Faber
Attorney, Agent, or Firm—Michael J. Striker

[57] ABSTRACT

A tracking servo system of a video or audio disc player, wherein the control data signals extracted from the electric signals read out from an information-carrying face of a video or audio recording disc are inhibited from being delivered from the servo system when the servo loop forming part of the system is open.

9 Claims, 6 Drawing Figures

TRACKING SERVO SYSTEM OF RECORDING DISC INFORMATION RECORDING AND REPRODUCING APPARATUS

This application is a continuation of application Ser. No. 204,753, filed Nov. 6, 1980.

BACKGROUND OF THE INVENTION

1. Field of the Invention

The present invention relates in general to an apparatus for recording and reproducing the information carried on a recording disc such as, for example, a video or audio disc to be optically, electrostatically or otherwise scanned. Particularly, the present invention is concerned with a signal processing circuit in a recording-disc reading and reproducing apparatus.

In a recording-disc information reading and reproducing apparatus of, for example, the optically or electrostatically scanning type, multiplex signals consisting of frequency modulated video and/or audio carriers superposed on each other are stored in the form of a series of depressed areas or "pits" formed in each or one information-carrying face of a video or audio disc. These depressed areas or pits are arranged in a spiral track or in a number of concentric tracks about the center axis of the disc. The video and/or audio information thus stored in the recording disc is read out by optically, electrostatically or otherwise scanning the individual pits along the spiral track or each of the concentric tracks. In the case of an optically scanning video or audio information reading and reproducing apparatus, for example, the video and/or audio information stored on a video or audio recording disc is read out by scanning the pits by means of a beam of laser light and thereby detecting the lengths of and spacings between the scanned pits. During playback of such a recording disc or during selection of desired pieces of information out of the information carried on the information-carrying face of the disc to be played back, the disc is driven for rotation about the center axis thereof and the beam of the laser light is displaced radially of the information-carrying face of the rotating disc. The laser beam thus directed onto a target track on the information-carrying face of the disc is reflected from the face or passed through the disc and the information picked up by the laser beam from the information-carrying face of the disc is converted into electric signals. These electric signals are further converted upon frequency demodulation into video and/or audio signals to be reproduced.

The laser beam to read out the information recorded on an information-carrying face of a video or audio disc is transmitted from a laser emitter to a tracking mirror through a lens system and is reflected from the tracking mirror toward the information-carrying face of the disc to be played back or scanned by the beam. The tracking mirror is turnably mounted on a slider movable back and forth in a radial direction of the disc to be played back or scanned and is urged to stay in a predetermined neutral or home angular position about the axis of rotation thereof on the slicer. During scanning of the video or audio disc to be played back, the slider is driven to travel in such a direction with respect to the disc and, concurrently, the tracking mirror is driven to turn between two opposite limit angular positions from the neutral or home angular position thereof about the axis of rotation of the mirror on the slider. These motions of the slider and the tracking mirror are effected under the control of a tracking servo system. The tracking servo system is arranged so that the servo loop to control the oscillating motions of the tracking mirror is closed when or after the laser beam directed toward the target track of the disc is incident on a spot close to the target track. If the servo loop is closed and the servo system is locked in before the scanning spot of the light is moved close to the target track, it may happen that the tracking mirror forming part of the optical pick-up system and operative to deflect the scanning beam in a radial direction of the video or audio disc is abruptly initiated into motion to reach the target track and thus overshoots the target track. In an extreme case, the tracking mirror may be caused to oscillate and disable the tracking servo system from being locked in. Such an event may be caused not only during scanning of a video disc but generally when the servo loop of the tracking servo system is to be closed from an open condition.

When the tracking mirror being turned about the axis of rotation thereof reaches one of the predetermined limit angular positions thereof, the tracking servo system controls the servo loop for the tracking mirror to open so as to allow the mirror to return to the neutral or home angular position thereof by the action of, for example, a return spring connected to or otherwise engaging the mirror. When the tracking mirror is thus returned to the neutral or home angular position thereof, the tracking servo system controls the servo loop for the mirror to close for a second time for enabling the mirror to repeat the oscillating motions.

The signals which are read out from an information-carrying face of a video or audio disc contain not only the video and/or audio signals to be reproduced but various control data signals such as the address signals indicative of the prescribed addresses in the spiral track or each of the concentric tracks on the information-carrying face of the disc. If there control data signals are used for the control of the movement of the mirror-carrying slider while the servo loop for the tracking mirror is open, the slider may be controlled erroneously and may fail to correctly scan the track or tracks on the information-carrying face of the disc being scanned by the beam.

The present invention contemplates provision of an improved tracking servo system which is free from such a problem.

SUMMARY OF THE INVENTION

In accordance with the present invention, there is provided a recording-disc reading and reproducing apparatus which includes a pick-up unit for producing a scanning spot on a recording disc and for deflecting said scanning spot radially of said recording-disc in response to a drive signal in order to make the scanning spot to trace a target track of said recording disc, and for producing an electric reproducing signal representative of a track signal recorded on said target track, said track signal containing an information signal to be reproduced and control data signals such as address signals, which is characterized by a tracking servo system including tracking error signal producing means operative to produce a tracking error signal continuously variable in magnitude with an amount of deviation, if any, of said scanning spot from said target track, and a pick-up unit actuating circuit for producing said drive signal in response to said tracking error signal; and a signal processing means including control data signal extracting means adapted to be operative for extracting said control data signal from said track signal only when said tracking servo system operates stably.

The tracking servo system thus constructed and arranged basically may further comprise a tracking servo loop for controlling the displacement of the scanning spot with respect to the recording disc, and switch means provided in the tracking servo loop and operative to be open in response to the output signal of the tripping means. In this instance, the tracking servo system may further comprise signal level detector means for detecting the signal levels of the signals produced by the detecting and transducing means and an output signal variable with the detected signal levels, comparing means for comparing the output signal from the signal level detector means with a reference signal having a predetermined level for producing an output signal when the former is higher in magnitude than the latter, and control signal producing means responsive to the tracking error signal and operative to produce a control signal when the tracking error signal is higher in magnitude than a reference signal having a predetermined level in the presence of the output signal from the comparing means, the switch means being operative to close in response to the control signal produced by the control signal producing means. The tripping means provided in the tracking system thus constructed and arranged may be connected between the control signal producing means and the switch means and between the switch means and the control data signal cut-off means and responsive to the control signal from the control signal producing means and to the signal passed through the switch means, the tripping means being operative to close the switch means in response to the control signal from the control signal producing means in the absence of the aforesaid actuating signal at the control terminal of the control data signal cut-off means and to cause the switch means to open in the presence of the actuating signal at the control terminal of the control data signal cut-off means regardless of the presence and absence of the control signal from the control signal producing means.

As an alternative, the tripping means provided in the tracking servo system constructed and arranged basically as hereinbefore set forth may comprise an inhibitor network connected between the detecting and transducing means and the control data signal cut-off means and responsive to the signals delivered from the detecting and transducing means, the inhibitor network being operative to produce the aforesaid variable signal variable with the signals from the detecting and transducing means and to compare the variable signal with the first named reference signal for delivering an output signal as the aforesaid actuating signal to the control terminal of the control data signal cut-off means when the former is higher in magnitude than the latter.

BRIEF DESCRIPTION OF THE DRAWINGS

The features and advantages of a tracking servo system according to the present invention will be more clearly understood from the hollowing description taken in conjunction with the accompanying drawings in which.

DETAILED DESCRIPTION OF THE PREFERRED EMBODIMENTS

Figure 1A:
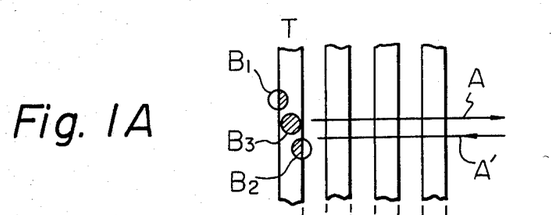
FIG. 1A is a view schematically showing a basic concept in which the location of the scanning spot with respect to a target track of an optically scanned video disc is to be detected by the use of index beams of light for producing a tracking error signal for use in a tracking error system proposed by the present invention for incorporation into an optical video disc player.

In order to produce signals to control the tracking and focus servo systems incorporated in an optical video disc player, two index beams of laser light are radiated onto the information-carrying face of the video disc being scanned by a scanning laser beam. The three beams of laser light are focused at points located in predetermined relationship with each other on the information-carrying face of the video disc being played back. FIG. 1A shows an example of such a relationship among the respective focused spots of these three beams, wherein the focused spots of the index beams are denoted by $B_1$ and $B_2$ and the focused spot of the scanning beam is denoted by $B_3$. In the example herein shown, the three beams are assumed to be directed toward a target track T so that one of the focused spots $B_1$ and $B_2$ of the index beams overlaps the target track T over one half area of the spot and the other focused spot overlaps the target track T over the other half area of the spot when the focused spot $B_3$ of the scanning beam is correctly located on the target track T. When the focused spots $B_1$, $B_2$ and $B_3$ of the index and scanning beams are thus located with respect to the target track T, the signal level of the reproducing signal Sr resulting from the light beam reflected from or passed through the focused spot $B_3$ of the scanning beam peaks up. If, furthermore, a tracking error signal is produced through detection of the difference between the levels of the signals produced from the light beams reflected from or passed through the focused spots $B_1$ and $B_2$ of the index beams, the error signal assumes a zero value when the focused spots $B_1$ and $B_2$ are located as illustrated in FIG. 1A since the levels of such signals are substantially equalized under such condition.

Figure 1B:
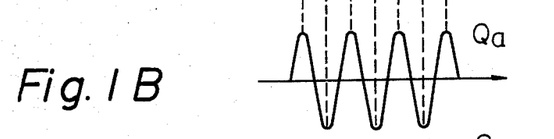
FIG. 1B is a graph showing an example of the waveform of the tracking error signal produced in the tracking servo system provided by the present invention.
Figure 1C:
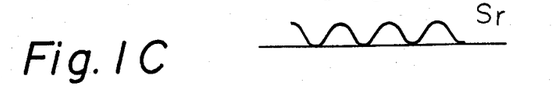
FIG. 1C is a graph showing an example of the waveform of the audio carrier component extracted from the reproducing read out from an optically scanned video disc in an apparatus according to the present invention.

If the scanning beam is then displaced radially of the information-carrying face of the video disc in one direction perpendicular to the target track T as indicated by arrow A in FIG. 1A, the level of the tracking error signal will vary sinusoidally as indicated by curve Qa in FIG. 1B as the scanning beam is moved from one of the parallel tracks or track portions to another. The level of the sinusoidal wave Qa varies in proportion to the distance between the center point of the focused spot $B_3$ of the scanning beam and the center line of the target track closest to the focused spot $B_3$. On the other hand, the polarities of the signal indicated by the sinusoidal wave Qa corresponds to the directions in which the focused spot $B_3$ of the scanning beam is moving toward and away from the target track. FIG. 1C shows an example of the waveform of the reproducing signal Sr read out from the target track thus scanned.

In controlling the tracking servo system reliably on the basis of the tracking error signal Qa produced in the above described manner, it is important that the servo loop of the tracking servo system be closed when the focused spot $B_3$ of the scanning beam is moved close to the target track. If the servo loop is closed when the focused spot $B_3$ of the scanning beam is located far ahead of the target track T or, in other words, the tracking error signal Qa is at a relatively high level, the tracking mirror adapted to deflect of displace the scanning beam in a radial direction of the information-carrying face of the video disc is abruptly initiated into motion attempting to reach the target track T and may overshoot the target track. In an extreme case, the tracking mirror may be caused to oscillate violently and disable the servo system from being locked in. The embodiment of the present invention is intended to provided an improved tracking servo system which can be locked in reliably in a stable condition when the servo loop of the system is to be closed from an open position.

Figure 2:
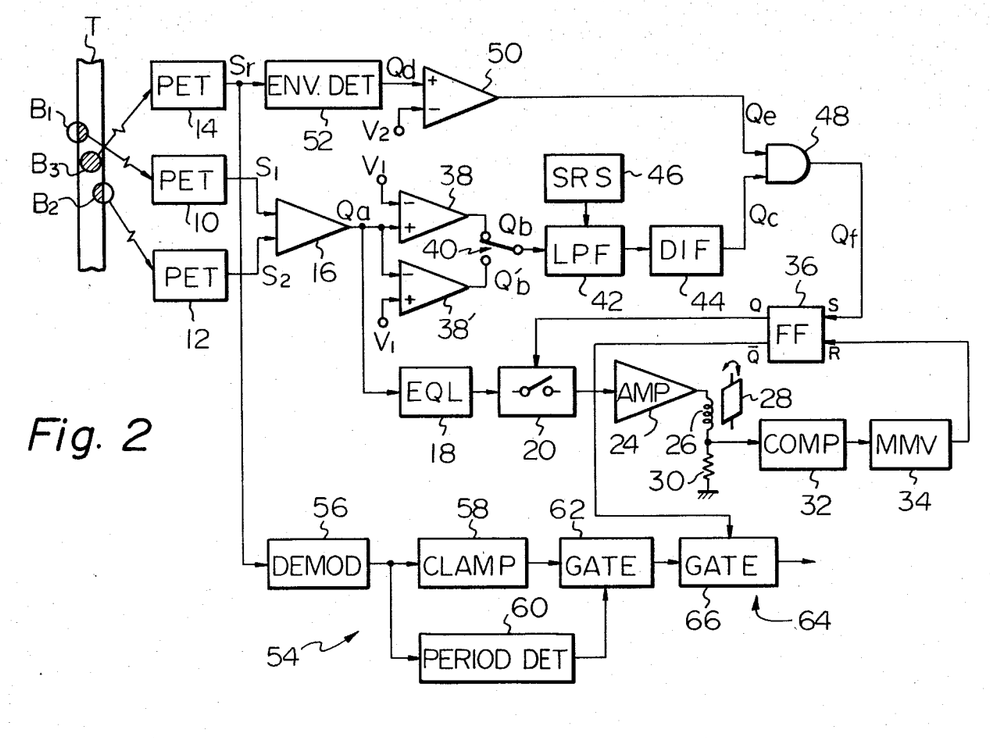
FIG. 2 is a block diagram showing the circuit arrangement of a preferred embodiment of the tracking servo system according to the present invention.

Referring to FIG. 2 of the drawings, the servo loop of such an improved servo system is shown comprising first, second and third photoelectric transducer units 10, 12 (PET) and 14 each adapted to convert luminous information into a corresponding electric signal. The first and second transducer units 10 and 12 are responsive to the beams of light reflected from or passed through the focused spots $B_1$ and $B_2$, respectively, of the index laser beams and are operative to produce output signals $S_1$ and $S_2$, respectively. The signal $S_1$ and $S_2$ have signal levels respectively proportional to the areas over which the focused spot $B_1$ and $B_2$ of the index laser beam overlap the target track T on the video disc being played back, as can be understood from the description previously made with reference to FIG. 1A. On the other hand, the third photoelectric transducer unit 14 is adapted to pick up the information read out by the scanning beam incidental on the information-carrying face of the video disc. Thus, the third photoelectric transducer unit 14 produces a reproducing signal Sr containing the video and audio information to be reproduced.

The output signals $S_1$ and $S_2$ delivered from the first and second photoelectric transducer units 10 and 12 are fed to subtractor means which is constituted by a differential amplifier 16 having two input terminals connected to the respective output terminals of the transducer units 10 and 12. The differential amplifier 16 is adapted to process the signals $S_1$ and $S_2$ as, for example, the subtrahend and minuend, respectively, and thereby produce an output signal indicative of the difference between the levels of the signals $S_1$ and $S_2$. The output signal produced by the differential amplifier 16 is, thus, the above mentioned tracking error signal Qa and varies sinusoidally as shown in FIG. 1B as the scanning beam is displaced radially of the information-carrying face of the video disc in a direction indicated by the arrow A in FIG. 1A.

The differential amplifier 16 has an output terminal connected through an equalizer circuit 18 (EQL) and across a switch 20 to an amplifier 24 (AMP) having an output terminal connected to a driver coil 26 for a tracking mirror 28. The tracking mirror 28 is pivotable about an axis fixed in the tracking unit of the optical video disc player. The switch 20 has a control terminal and is closed when the control terminal thereof is supplied with an actuating signal.

The driver coil 26 for the tracking mirror 28 is grounded through a resistor 30. The voltage across the resistor 30 is constantly monitored by suitable monitoring means which is herein shown comprising a series combination of a window comparator 32 (COMP) and a monostable vibrator 34 (MMV). The window comparator 32 is adapted to pass therethrough voltages which are higher and lower than predetermined positive and negative limits, respectively, having equal magnitudes. When the absolute value of the voltage across the resistor 30 becomes higher than the absolute value of such limits, the window comparator 32 produces an output signal such as a logic "1" signal and thereby triggers the monostable multivibrator 34. The absolute value of the positive and negative limits registered on the window comparator 32 is selected to correspond to the angle of a predetermined limit angular position of the tracking mirror 28 from a predetermined neutral or home angular position of the mirror about the axis of the mirror. The output terminal of the monostable multivibrator 34 is connected to the reset terminal R of a set-reset flipflop circuit 36 (FF). When triggered by the output signal from the window comparator 32, the monostable multivibrator 34 thus produces a single-shot signal and thereby resets the flipflop circuit 36. The set-reset flipflop circuit 36 has a non-inverted signal output terminal Q and an inverted signal output terminal $\bar{Q}$. The non-inverted signal output terminal Q of the flipflop circuit 36 is connected to the previously mentioned control terminal of the switch 20 forming part of the tracking servo loop.

The tracking loop shown in FIG. 2 further comprises control signal producing means which includes first and second comparator circuits 38 and 38' each having two, positive and negative input terminals. The positive input terminal of the first comparator circuit 38 and the negative input terminal of the second comparator circuit 38' are connected jointly to the output terminal of the differential amplifier 16, while the negative input terminal of the first comparator circuit 38 and the positive input terminal of the second comparator circuit 38' are connected to a source or sources of a reference signal having a predetermined voltage $V_1$ as shown. Thus, the first comparator circuit 38 is operative to compare the level of the signal Qa with the predetermined voltage $V_1$ and produce pulse signals Qb when the former is higher than the latter. On the other hand, the second comparator circuit 38' is operative to compare the level of the output signal Qa from the differential comparator 16 with the predetermined voltage $V_1$ and produce pulse signals Qb' when the former is lower than the latter.

The respective output terminals of the first and second comparator circuits 38 and 38' thus arranged are connected across a two-position switch 40 and through a digital low-pass filter 42 (LPF) to the inputer terminal of a differentiator circuit 44 (DIF). The two-position switch 40 is controlled to selectively provide connection between the first comparator circuit 38 and the low-pass filter 42 when the scanning beam is displaced in the direction of the arrow A shown in FIG. 1A, or connection between the second comparator circuit 38' and the low-pass filter 42 when the scanning beam is displaced in the opposite direction indicated by A' in FIG. 1A. The pulse signals Qb or Qb' delivered respectively from the first or second comparator circuit 38 or 38' and passed through the two-position switch 40 and the low-pass filter 42 is differentiated with respect to time in the differentiator circuit 44. Thus, the differentiator circuit 44 produces impulse signals Qc when the two-position switch 40 is in a position providing connection from the first comparator circuit 38 to the low-pass filter 42 as shown in FIG. 2. The digital low-pass filter 42 is provided for the purpose of enabling the tracking servo system to be locked in at low frequencies of the tracking error signal Qa because the servo system might be disabled from being locked in when the tracking error signal Qa occurs at excessively high frequencies. When the scanning rate is increased, the cut-off frequency of the low-pass filter 42 is also increased with the increase in the scanning rate which, in this instance, is defined as the velocity at which the scanning beam directed onto the information-carrying face of the video disc is displaced radially of the particular face of the disc. For this purpose, the low-pass filter 42 has a cut-off frequency control terminal connected to a scanning rate shifter 46 (SRS) so that the cut-off frequency of the filter is variable with the scanning rate selected by the scanning rate shifter 46.

The impulse signals Qc delivered from the differentiator circuit 44 are fed to one input terminal of a two-input logic "AND" gate circuit 48. The other input terminal of the "AND" gate circuit 48 is connected to the output terminal of comparing means which is constituted by a comparator circuit 50 having positive and negative input terminals. The negative input terminal of the comparator circuit 50 is connected to source of a reference signal having a predetermined voltage $V_2$, while the positive input terminal of the comparator circuit 50 is connected to signal level detector means adapted to detect the signal level of the reproducing signal Sr and to produce an output signal Qd variable with the detected signal level. In the arrangement shown in FIG. 2, such detector means is shown comprising an envelope detector circuit 52 (ENV. DET) operative to detect the level of the envelope of the frequency modulated reproducing signal Sr of, particularly, the envelope of the audio carrier component of the reproducing signal Sr and produces as the above mentioned signal Qd a signal variable with the detected level of the envelope. To the positive terminal of the detector circuit 52 is thus impressed the signal Qd indicative of the level of the envelope of the frequency modulated reproducing signal Sr or the audio carrier component thereof.

The comparator circuit 50 is adapted to compare the level of the output signal Qd from the envelope detector 52 with the predetermined voltage $V_2$ and produce a series of positive pulse signals Qe when the former is higher than the latter. The pulse signals Qe are fed to one input terminal of the logic "AND" gate circuit 48 so that the impulse signals Qc supplied from the differentiator circuit 44 are selectively passed through the "AND" gate circuit 48 as indicative at Qf in FIG. 2 in the presence of the pulse signals Qe from the comparator circuit 50. The output terminal of the "AND" gate circuit 48 is connected to the set terminal S of the flip-flop circuit 36, the non-inverted signal output terminal Q of which is connected to the control terminal of the switch 20 of the tracking servo loop as previously noted.

The leading and trailing edges of the pulse signals Qb supplied from the first comparator circuit 38 correspond to the zero value of the tracking error signal Qa produced when the scanning beam is displaced in the direction of the arrow A in FIG. 1A with respect to the information-carrying face of the video disc being played back. More specifically, each of the trailing edges of the pulse signals Qb indicates that the focused spot $B_3$ of the scanning beam is correctly located on each of the parallel tracks portions shown in FIG. 1A while each of the leading edges of the pulse signals Qb indicates that the focused spot $B_3$ of the scanning beam is located centrally between every adjacent two of the parallel tracks or track portions. Supplied with such pulse signals Qb, the differentiator circuit 44 produces alternately positive and negative impulse signals Qc which are positive in response to the trailing edges of the pulse signals Qb and negative in response to the leadihng edges of the pulse signals Qb.

On the other hand, the pulse signals Qe supplied from the comparator circuit 50 indicate that the frequency modulated reproducing signal Sr or the audio carrier component thereof is at peak levels or close to the peak levels. Such pulse signals Qe are fed as gate signals to the "AND" gate circuit 48 so that only the positive ones of the impulse signals Qc are passed through the "AND" gate circuit 48. Thus, each of the impulse signals Qf delivered from the "AND" gate circuit 48 occurs when the amount of tracking error is minimum and concurrently the level of the reproducing signal Sr or the audio carrier component thereof is at or close to a peak value. The switch 20 is closed at such a timing that the tracking servo system can be locked in accurately and reliably.

It may be mentioned that the tracking servo system can be locked in not only in the presence of an audio signal in the original reproducing signal Sr but also in the absence of an audio signal in the reproducing signal Sr provided the reproducing signal Sr contains video information. This is because of the fact that the reproducing signal Sr containing video information contains an audio carrier although the signal may not contain audio information.

When, on the other hand, the voltage across the resistor 30 connected to the driver coil 26 for the tracking mirror 28 is higher than a predetermined upper limit or lower than a predetermined lower limit which is equal in magnitude to the upper limit, the window comparator 32 triggers the monostable multivibrator 34 and thereby causes the flipflop circuit 36 to be reset. The switch 20 of the servo loop for the tracking mirror 28 is now made open and prevents the tracking mirror 28 from being turned beyond its predetermined limit angular position about the axis of rotation thereof. The time constant of the monostable vibrator 34 is thus selected in consideration of the period of time for which the tracking mirror 28 is forced to restore its proper angular position by the action of the resilient biasing means (not shown) provided in association therewith after the switch 20 is made open.

When the scanning beam is displaced in a direction indicated by the arrow A' in FIG. 1A with respect to the parallel tracks or track portions on a video disc, the two-position switch 40 is shifted to a position providing connection from the second comparator circuit 38' to the low-pass filter 42 therethrough. Under such conditions, the tracking error signal delivered from the differential amplifier 16 takes a waveform so that the pulse signals Qb' produced by the second comparator circuit 38' appear in a waveform similar to the waveform of the pulse signals Qb shown in FIG. 1B. The circuit components subsequent to the comparator circuit 38' thus operate similarly to those connected to the first comparator circuit 38.

Although it has been assumed that the tracking servo loop of the embodiment of FIG. 2 is closed during scanning of the tracks on a video disc, the servo loop is controlled in a similar manner when the loop is to be closed during other operational conditions.

In the tracking servo system shown in FIG. 2, there is further provided a control data signal extracting network 54 for extracting control data signals out of the output signals delivered from the third photoelectric transducer unit 14. As is well known in the art, the pieces of information, which the scanning beam traces in a a track on the information-carrying face of a video disc include not only the video and audio signals to be reproduced but control data signals such as the address signals which are representative of the addresses in the track being traced. These control data signals appear during each of prescribed discrete periods of cycle during which the video and audio signals as well as the synchronizing signals concomitant therewith in the waveform of the signals delivered from the phototranducer unit 14 are blanked out. Such control data signals are used primarily as the basic control signals for the tracking servo system, especially for the control of the linear movement of the mirror carrying slider (not shown) driven to move under the control of the tracking servo system.

In the tracking servo system shown in FIG. 2, the control data signal extracting network 54 for extracting such signals is shown comprising a frequency demodulator circuit 56 (DEMOD) having an input terminal which is connected to the output terminal of the third phototransducer unit 14 and which is adapted to frequency demodulate the output signals delivered from the transducer unit 14. The frequency demodulator circuit 56 is operative to produce multiplex signals containing the video and audio signals to be reproduced and the above mentioned control data signals. These control data signals are fed to a clamping circuit 58 (CLAMP) and a period detector circuit 60 (PERIOD DET) which are commonly connected in parallel to the output terminal of the frequency demodulator circuit 56. The clamping circuit 58 is adapted to add a fixed or adjustable bias to the waveform of the signals delivered from the frequency demodulator circuit 56. On the other hand, the period detector circuit 60 is adapted to detect the prescribed discrete periods of cycle during which the control data signals such as the above mentioned address signals contained in the output signals from the frequency demodulator circuit 56 appear and to thereby produce pulse signals each lasting for a period of time corresponding to each of such discrete periods of cycle. The clamping circuit 58 and the period detector circuit 60 thus operative have respective output terminals connected to a gate circuit 62 (GATE). The gate circuit 62 has an input terminal connected to the clamping circuit 58 and a trigger terminal connected to the period detector circuit 60 and is, thus, enabled to pass therethrough the output signals from the clamping circuit 58 only in the presence of signals appearing at the output terminal of the period detector circuit 60. Only those control data signals are address signals which are contained in the output signals from the frequency demodulator circuit 56 are in this manner passed through the gate circuit 62. The clamping circuit 58 is provided simply for the purpose of upgrading the quality of the control data signals to be used as the basic control signals for controlling the linear movement of the tracking-mirror carrying slider and, for this reason, may be dispensed with if desired. In this instance, the output terminal of the frequency demodulator circuit 56 is connected directly to the input terminal of the gate circuit 62 as well as to the input terminal of the period detector circuit 60.

In accordance with the present invention, the control data signal extracting network 54 is connected to a control data signal cut-off network 64 which, in the embodiment of FIG. 2, comprises a gate circuit 66 (GATE) having an input terminal connected to the output terminal of the above mentioned gate circuit 62 and a control terminal connected to the inverted signal output terminal $\overline{Q}$ of the previously described flipflop circuit 36, as shown. The gate circuit 66 constituting the signal cut-off network 64 is, thus, enabled to pass therethrough the output signals from the gate circuit 62 only in the presence of a pulse signal appearing at the inverted signal output terminal $\overline{Q}$ of the flipflop circuit 36.

As will have been understood from the previous description, a signal of, for example, a logic "1" value appears at the non-inverted signal output terminal Q of the flipflop circuit 36 and holds the switch 20 of the tracking servo loop closed in the presence of a logic "1" signal appearing at the set terminal S of the flipflop circuit 36. In this instance, a signal of, for example, a logic "0" value appears at the inverted signal output terminal $\overline{Q}$ of the flipflop circuit 36. The gate circuit 66 is assumed, by way of example, to be constructed and arranged in such a manner as to remain operative in the presence of the logic "0" signal at the control terminal thereof. The control data signal cut-off network 64 provided in the tracking servo system shown in FIG. 2 is, in this fashion, held in a condition passing therethrough the control data or address signals passed through the gate circuit 62 of the control data extracting network 54 when the switch 20 in the tracking servo loop is kept closed.

When, on the other hand, the monostable multivibrator 34 is triggered to deliver an output signal of, for example, a logic "1" value to the reset terminal R of the flipflop circuit 36, then the flipflop circuit 36 is cleared to produce a logic "0" output signal at the non-inverted signal output terminal Q and a logic "1" output signal at the inverted signal output terminal $\overline{Q}$ thereof. The logic "0" signal appearing at the non-inverted signal output terminal Q of the flipflop circuit 36 is impressed on the control terminal of the switch 20 and thereby causes the switch 20 to open. The logic "1" signal appearing at the inverted signal output terminal $\overline{Q}$ of the flipflop circuit 36 is appled to the control terminal of the gate circuit 66 and causes the gate circuit 66 to interrupt passage therethrough of the control data signals passed through the gate circuit 62 of the control data signal extracting network 54. The control data signals delivered from the signal extracting network 54 are thus cut off by the gate circuit 66 when the switch 20 in the tracking servo loop is held open.

If desired, the embodiment of the tracking servo system hereinbefore described with reference to FIG. 2 may be modified in such a manner that the non-inverted and inverted signal output terminals Q and $\overline{Q}$ of the flipflop circuit 36 are connected respectively to the control terminal of the gate circuit 66 of the control data signal cut-off network 64 and to the control terminal of the switch 20 in the tracking servo loop. For this purpose, the switch 20 is arranged to close and open in response to signals of, for example, logic "0" and "1" values, respectively, applied to the control terminal thereof and, likewise, the gate circuit 66 is arranged to be operative and inoperative in response to signals of, for example, logic values "1" and "0" values, respectively, applied to the control terminal thereof. If, furthermore, the switch 20 is arranged to be open and the gate circuit 66 is arranged to be inoperative when both of the signals appearing at the control terminal of the switch 20 and the control terminal of the gate circuit 66 are of, for example, either a logic "1" value or a logic "0" value, then only one of the non-inverted and inverted signal output terminals Q and $\overline{Q}$ of the flipflop circuit 36 may be connected to these control terminals of the switch 20 and the gate circuit 66.

In a video disc player including a tracking servo system of the general nature hereinbefore described with reference to FIG. 2, the tracking mirror 28 driven to turn under the control of the tracking servo loop including the switch 20 is constantly urged to return to its neutral or home angular position about the axis of rotation thereof by means of a return spring (not shown) connnected to or otherwise engaging the tracking mirror 28. It therefore sometimes happens that the spring-loaded tracking mirror 28 is disabled from accurately following the variation in the current flowing through the driver coil 26 for the mirror 28 when the mirror 28 is turning close to one of the opposite limit angular positions thereof or is on the point of reaching such an angular position about the axis of rotation of the mirror 28. When this occurs, the tracking mirror 28 tends to be brought out of control of the tracking servo loop and may therefore behave without respect to or at least with less respect to the current supplied to the driver coil 26. Such a tendency is pronounced when the positive and negative limits predetermined for the window comparator 32 are selected at a large absolute value. If the slider carrying the tracking mirror 28 is controlled to move on the basis of the control data or address singals delivered from the control data signal extracting network 54 under such a condition, the slider is operated to move regardless of the actual angular position of the mirror 28 with respect to the target track on the information-carrying face of the video disc being scanned.

Figure 3:
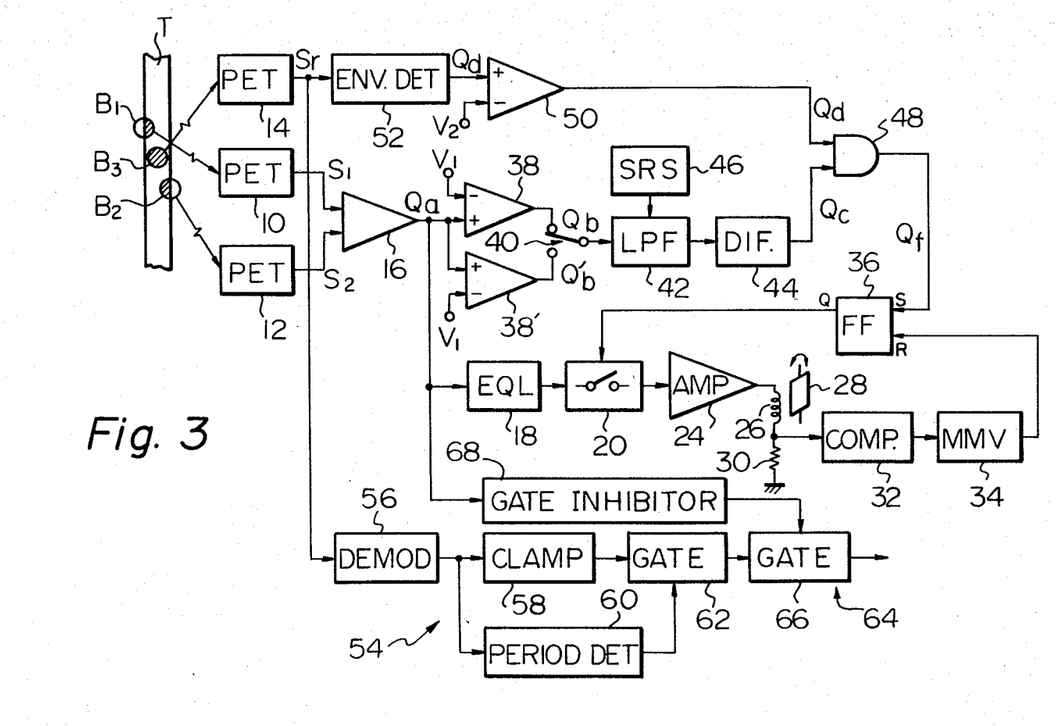
FIG. 3 is a view similar to FIG. 2 but showing another preferred embodiment of the tracking servo system according to the present invention.

In the embodiment of FIG. 2, this problem results essentially from the fact that the gate circuit 66 of the control data signal cut-off network 64 is made inoperative by tripping means which is composed of the combination of the mirror driver coil 26, window comparator 32, monostable multivibrator 34 and flipflop circuit 36 and which is thus responsive to the signal passed through the switch 20 and accordingly the voltage developed across the driver coil 26 for the tracking mirror 28. Since the signal passed through the switch 20 is variable with the output signal Qa from the differential amplifier 16, the above described problem encountered in the embodiment of FIG. 2 can be solved through modification of the tripping means in such a manner that the modified tripping means is responsive to a signal which is variable with the output signal Qa from the differential amplifier 16 in a manner essentially different from the manner in which the signal passed through the switch 20 is variable with the signal Qa. FIG. 3 shows an embodiment of the tracking servo system having such modified tripping means incorporated therein.

Referring to FIG. 3, the modified tripping means is provided in combination with control data signal extracting and cut-off networks which are constructed and arranged similarly to their respective counterparts in the embodiment of FIG. 2 and which are accordingly also designated by reference numerals 54 and 64, respectively.

The tripping means in the embodiment of FIG. 3 is adapted to operate when the tracking mirror 28 is brought or liable to be brought out of control of the tracking servo system and comprises a gate inhibitor network 68 having an input terminal connected to the output terminal of the differential amplifier 16 and an output terminal connected to the control terminal of the gate circuit 66 constituting the control data signal cut-off network 64.

As previously described in detail, the differential amplifier 16 is operative to produce an output signal Qa which is representative of the difference between the levels of the output signals $S_1$ and $S_2$ delivered from the first and second photoelectric transducer units 10 and 12, respectively. The output signal Qa delivered from the differential amplifier 16 is, thus, indicative of an amount of deviation of the scanning beam from a target track on the information-carrying face of the video disc being scanned and varies in sinusoidal form as indicated in the graph of FIG. 1B as the scanning beam is displaced radially of the information-carrying face of the disc.

The gate inhibitor network 68 is constructed and arranged to be operative, in effect, for comparing such an amount of deviation with a predetermined value. This predetermined value may correspond to such an angle of rotation of the tracking mirror 28 that is smaller than the angle between the neutral or home angular position and each of the above mentioned predetermined limit angular positions of the mirror 28 about the axis of rotation thereof. Upon detection of an amount of deviation larger than such a predetermined value, the gate inhibitor circuit 68 produces a pulse signal having a logic "1" value by way of example and a predetermined time duration and supplies the signal to the control terminal of the gate circuit 66, thereby inhibiting the gate circuit 66 from passing therethrough the control data or address signals passed through the gate circuit 62 of the control data signal extracting network 54.

Figure 4:
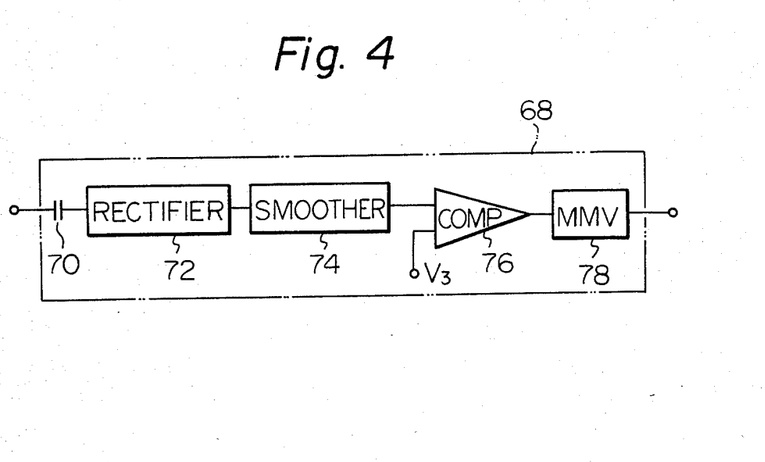
FIG. 4 is a block diagram schematically showing an example of the gate inhibitor network included in the embodiment illustrated in FIG. 3.

FIG. 4 shows diagrammatically an example of the circuit arrangement of the gate inhibitor network 68 to achieve these functions. In FIG. 4, the gate inhibitor network 68 is shown, comprising a series combination of a capacitor 70, a rectifier circuit 72, a smoother circuit 74, a comparator circuit 76 (COMP) and a monostable multivibrator 78 (MMV). The capacitor 70 is connected between the output terminal of the differential amplifier 16 and the input terminal of the rectifier circuit 72 and is provided for alternating-current filtering or direct-current absorbing purposes. The capacitor 70 is, thus, operative to suppress the direct-current component possibly contained in the waveform of the output signals Qa delivered from the differential amplifier 16. The signals Qa having a waveform alternating as shown in the graph of FIG. 1B at frequencies approximating 4 to 5 KHz for example, are passed through the rectifier circuit 72 and are thereafter fed to the smoother circuit 74 for being rendered into a substantially smooth waveform having, for example, a positive polarity. The comparator circuit 76 has two input terminals, one of which is connected to the output terminal of the smoother circuit 74 and the other of which is connected to a source of a suitable reference signal in the form of a predetermined voltage $V_3$. This predetermined voltage $V_3$ is herein assumed, by way of example, to be of a value which the voltage of the output signal from the smoother circuit 74 will assume when the amount of deviation of the scanning beam from a target track on the information-carrying face of the video disc being scanned by the beam corresponds to such an angle of rotation of the tracking mirror 28 that is smaller than the angle between the neutral or home angular position and each of the previously mentioned predetermined limit angular positions of the mirror 28.

The comparator circuit 76 is operative to produce an output signal of, for example, a logic "1" value when the voltage of the signal delivered thereto from the smoother circuit 74 is higher than the predetermined voltage $V_3$. The signal thus delivered from the comparator circuit 76 is fed to the input terminal of the monostable multivibrator 78 which is adapted to produce a pulse signal having a predetermined duration in response to the signal from the comparator circuit 76. The output terminal of the monostable multivibrator 78 is connected to the control terminal of the gate circuit 66 of the control data signal cutoff network 64 shown in FIG. 3. The pulse signal produced at the output terminal of the monostable multivibrator 78 is therefore fed as the output signal of the gate inhibitor network 68 to the control terminal of the gate circuit 66 and maintains the gate circuit 66 inoperative for a period of time dictated by the pulsewidth of the output signal from the monostable multivibrator 78. The gate circuit 66 is in this fashion made inoperative and as a consequence the flow of the control data signals delivered from the control data signal extracting network 54 is blocked by the gate circuit 66 when the tracking mirror 28 is brought or being brought out of control of the tracking servo system. If desired, the monostable multivibrator 78 may be dispensed with so that the output signal from the comparator circuit 76 is fed directly to the gate circuit 66.

It has been described that the gate circuit 66 constituting the control data signal cut-off network 64 in each of the embodiments of the present invention is rendered inoperative either by the tripping means composed of the window comparator 32, monostable multivibrator 34 and flipflop circuit 36 as in the embodiment of FIG. 2 or the tripping means constituted by the gate inhibitor network 68 as in the embodiment of FIG. 3. It will be, however, apparent that, if desired, arrangements may be made so that the gate circuit 66 is made inoperative selectively by the tripping means of the embodiment of FIG. 2 and the tripping means of the embodiment of FIG. 3. In order to realize such arrangements, a logic "OR" gate circuit may be provided which has its input terminals respectively connected to the inverted signal output terminal $\overline{Q}$ of the set-reset flipflop circuit 36 as in the embodiment of FIG. 2 or to the output terminal of the gate inhibitor network 68 as in the embodiment of FIG. 3 and its output terminal connected to the control terminal of the gate circuit 66.

It will also be apparent that, while the embodiments of the present invention has been described on the assumption that the tracking servo system proposed by the present invention forms part of a video disc player of the optically recording and reading type, the gist of the present invention is applicable not only to such a type of video disc player but to any other types of video or audio disc players of, for example, the electrostatically recording and reading type. The term "scanning spot" as referred to in the appending claims and elsewhere in the foregoing description regarding the general aspects of the present invention should therefore be understood to mean not only a spot at which a beam of light is incident on an information-carrying face of a disc but a spot at which a pickup element of another type such as an electrode stylus of an electrostatic reading device is directed onto an information-carrying face of an audio or video disc.

It will further be understood that the gate circuit 66 forming part of the control data signal cut-off network 64 in each of the embodiments shown in FIGS. 2 and 3 may be constituted, if desired, as part of the gate circuit 62 of the control data signal extracting network 54. In this instance, the gate circuit 62 of the signal extracting network 54 may be of the type having an inhibitor terminal and thus adapted to cut off the passage of a signal between the input and output terminals thereof in the presence of a signal at the inhibitor terminal. The inhibitor terminal of the gate circuit of this type is connected to the inverted output terminal $\overline{Q}$ of the flipflop circuit 36 in the embodiment of FIG. 2 or to the output terminal of the gate inhibitor network 68 in the embodiment of FIG. 3.

It will be understood that each of the elements described above, or two or more together, may also find a useful application in other types of tracking servo systems differing from the types described above.

While the invention has been illustrated and described as embodied in a recording and reproducing apparatus, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a recording disc reproducing apparatus, which includes a pick-up unit for producing a scanning spot on a recording disc and for deflecting said scanning spot radially of said recording-disc in response to a drive signal in order to make the scanning spot trace a target track of said recording disc, and for producing an electric reproducing signal representation of a track signal recorded on said target track, said track signal containing an information signal to be reproduced and control data signals such as address signals, a tracking servo system including tracking error signal producing means operative to produce a tracking error signal continuously variable in magnitude with an amount of deviation, if any, of said scanning spot from said target track and a pick-up unit actuating circuit for producing said drive signal in response to said tracking error signal;

a servo loop closure switch provided between said pick-up unit actuating circuit and said pick-up unit and a servo loop closure control means connected to said servo loop closure switch and operative for producing a servo loop closure command signal in accordance with said electric reproducing signal and said tracking error signal, said servo loop closure switch being operative for relaying said drive signal to said pick-up unit only when it receives the servo loop closure command signal, control data extracting means for extracting said control data signals from said track signal; and data signal preventing means for blocking said control data signals from being supplied to a succeeding stage when said servo loop closure signal is absent.

2. A recording disc reproducing apparatus as defined by claim 1, wherein said control data signal extraction means include:

a demodulator for demodulating said electric electric reproducing signal, a clamp circuit for adjusting the signal level of the demodulated signal from said demodulator;

a period detector for detecting discrete periods during which said control data signals appear and for producing pulse signals such lasting for a period of time corresponding to each of said discrete periods; and gate means for passing therethrough the demodulated and clamped signal in response to said pulse signals from said period detector.

3. A recording-disc reproducing apparatus as defined by claim 2, wherein said data signal blocking means includes a gate for passing therethrough said control data signals from said control data extracting means only when said servo loop closure signal exists.

4. A recording-disc reproducing apparatus as defined by claim 1, wherein said servo loop closure control means includes a signal envelope detector connected to said pick-up unit for producing an envelope signal representative of the envelope of said electric reproducing signal; a first track existence signal generator for comparing said envelope signal with a predetermined reference level and for producing a first track existence signal when said envelope signal is higher than said predetermined reference level; a second track existence signal generator for producing a second track existence signal when a differential component of said tracking error signal has a level higher than a predetermined level; and a servo loop closure command signal generator for producing said loop closure command signal in response to said first and second track existence signals until said tracking error signal exceeds a predetermined high level.

5. A recording disc reproducing apparatus as defined by claim 4, wherein said servo loop closure command signal generator includes an AND gate having the input terminals thereof respectively connected to said first and second track existence signal generators, a flip-flop circuit having the set terminal thereof connected to the output terminal of said AND gate, a window comparator for producing a pulse signal when said tracking error signal exceeds in magnitude said predetermined high level, and monostable multivibrator being triggered by said pulse signal from said window comparator so as to apply a reset pulse to a reset terminal of said flip-flop circuit in response to said pulse signal from said window comparator, and in which said gate means is responsive to the output terminal of said flip-flop circuit.

6. In a recording-disc reproducing apparatus, which includes a pick-up unit for producing a scanning spot on a recording disc and for deflecting said scanning spot radially of said recording-disc in response to a drive signal in order to make the scanning spot trace a target track of said recording disc, and for producing an electric reproducing signal representative of a track signal recorded on said target track, said track signal containing an information signal to be reproduced and control data signals such as address signals;

a tracking servo system including tracking error signal producing means operative to produce a tracking error signal continuously variable in magnitude with an amount of deviation, if any, of said scanning spot from said target track and a pick-up unit actuating circuit for producing said drive signal in response to said tracking error signal;

control data signal extraction means for extracting said control data signal from said track signal; and data signal blocking means for preventing said data signals from being supplied to a succeeding stage when said tracking servo system is unstable, in which said data signal blocking means includes a blocking signal generator for comparing the level of said tracking error signal with a predetermined level and for producing a blocking signal when the level of said tracking error signal is larger than said predetermined level, and a gate for passing therethrough said track signal in the absence of said blocking signal.

7. A recording disc reproducing apparatus as defined by claim 6, wherein said control data signal extraction means include:

a demodulator for demodulating said electric reproducing signal, a clamp circuit for adjusting the signal level of the demodulated signal from said demodulator;

a period detector for detecting discrete periods during which said control data signals appear and for producing pulse signals such lasting for a period of time corresponding to each of said discrete periods; and gate means for passing therethrough the demodulated and clamped signal in response to said pulse signals from said period detector.

8. A recording-disc reproducing apparatus as defined by claim 6, wherein said blocking signal generator includes a direct-current absorbing element connected to said tracking error signal producing means, for filtering an alternating current component from said tracking error signal, a rectifier circuit for rectifying the output signal from said direct current absorbing element, a smoothing circuit for smoothing the output signal from rectifying circuit so as to produce a continuously variable signal having an intensity according to the level of said tracking error signal, a comparator circuit for producing a trigger signal when the intensity of the rectified signal exceeds a predetermined reference level, and pulse generator for producing said gate inhibiting signal in response to said trigger signal.

9. A recording-disc reproducing apparatus as defined by claim 8, wherein said pulse generator is a monostable multivibrator.

* * * * *